United States Patent [19]

Muller

[11] Patent Number: 5,494,542
[45] Date of Patent: Feb. 27, 1996

[54] METHOD OF MAKING VACUUM FORMED ARTICLE WITH INTEGRALLY JOINED DEVICE

[75] Inventor: John Muller, Englewood, Tenn.

[73] Assignee: Davidson Textron Inc., Dover, N.H.

[21] Appl. No.: 336,770

[22] Filed: Nov. 9, 1994

[51] Int. Cl.⁶ .......................... B29C 51/10; B29C 51/12; B29C 51/36
[52] U.S. Cl. .................. 156/66; 24/289; 156/212; 156/245; 156/285; 156/298; 264/510; 264/511; 428/67; 428/99; 428/100
[58] Field of Search .................. 156/66, 212, 245, 156/285, 297–298, 309.6, 309.9; 264/510–511, 553–554; 24/289–297; 428/31, 67, 99–100

[56] References Cited

U.S. PATENT DOCUMENTS 4,116,736  9/1978  Sanson et al. .
4,130,615  12/1978 Decker, Jr. et al. .
4,806,302  2/1989  Frank .
4,891,081  1/1990  Takahashi et al. .
5,056,199  10/1991 Stein et al. ........................ 24/297 X
5,324,460  6/1994  Briggs .

*Primary Examiner*—Adrienne C. Johnstone
*Attorney, Agent, or Firm*—Reising, Ethington, Barnard & Perry

[57] ABSTRACT

A method of simultaneously vacuum forming a plastic article and integrally joining a device thereto is disclosed wherein a lock defining surface is formed on an anchoring end of the device, a heat activated adhesive is applied to the lock defining surface, and air is drawn through vacuum holes in the mold surface that defines the shape of the article and is also drawn through vacuum holes in the lock defining surface to draw a heated sheet of thermoplastic material onto the mold surface and also into interlocking relationship with the lock defining surface to form the article and to mechanically interlock and adhere the device to the formed article.

9 Claims, 2 Drawing Sheets

1

METHOD OF MAKING VACUUM FORMED ARTICLE WITH INTEGRALLY JOINED DEVICE

TECHNICAL FIELD

This invention relates to vacuum formed articles with an integrally joined device and more particularly to vacuum formed articles with a device that is mechanically interlocked therewith in the vacuum forming process.

BACKGROUND OF THE INVENTION

Automotive interior trim panels are constructed in various forms including laminated structures wherein for example a stiff thin wall vinyl substrate supports a soft vinyl skin with a layer of urethane foam therebetween. The panel is then attached to the interior of an automobile on an assembly line by various forms of fasteners such as of the hook type and so-called "Christmas tree" type that are inserted and retained at their anchoring end in holes formed in the substrate. There may also be alignment pins that are similarly anchored to the substrate to aid in installation of the panel. The substrate can be molded in various ways such as by injection molding the article or vacuum forming a sheet of thermoplastic material such as expanded vinyl to the desired shape. As a cost saving measure, it is desirable that the fasteners be integrally joined with the substrate in the molding process rather than later attached thereto.

In injection molding, the molten plastic can be readily forced to surround an anchoring end of a fastener inserted in the mold cavity and then mechanically interlock therewith on solidification to firmly retain the fastener in place on the injection molded article. But this form of capturing and retaining a fastener by molding it in place with an equivalent mechanical interlocking relationship is not available with the vacuum forming process. In the latter process, the heated plastic sheet is normally drawn to the mold surface by withdrawing air through small vacuum holes provided therein. The vacuum holes are normally made small enough so as to not create dimples in the formed article and are spaced throughout the area of the mold surface to bring the heated plastic sheet into full area contact with the mold surface. But they are not suited to also drawing the heated sheet into full area contact with the interlocking surface of the anchor end of a fastener were it to be inserted in a cavity in this mold surface like in injection molding.

SUMMARY OF THE INVENTION

The present invention provides full area contact mechanical interlocking between a device such as a fastener and an article formed from a sheet of thermoplastic material in the vacuum forming of the latter to a desired shape such as that of an automotive interior trim panel substrate or other article requiring fastening and where the fasteners could be added to the vacuum formed article. Moreover, this is accomplished in a very cost effective manner that also allows an adhesively joined mechanical interlock as well where maximum retention strength is required.

In the present invention, the device such as fastener that is to be joined to a vacuum formed article such as a panel substrate is formed with an anchoring base having a locking configuration and one or more penetrating vacuum holes of larger size than the vacuum holes in the mold surface. The fastener is further formed with an attaching end that extends from the base for attaching the article in an assembly. The fastener is preferably an injection molded part made of a tough plastic material such as nylon. Where the vacuum formed article is an automotive interior trim panel substrate, the attaching device may be of the commonly used hook type or Christmas tree type and may be integrally formed with the base or be a separate part that is assembled thereto. The mold surface for vacuum forming the article is formed with a contour that defines the shape of the desired article and a cavity is formed in the mold surface for each of the fasteners that are to be joined with the vacuum formed article. The cavities locate and support the base of the fasteners and also receive and shelter the attaching device of the fastener. These cavities also define with the respective bases a vacuum chamber and thereby a passage in the mold for drawing air through the vacuum holes in the base. The number of fastener accommodating mold cavities and their location and the type of attaching device will of course depend on the fastener requirements for a particular vacuum molded article and its intended usage.

Small vacuum holes are formed in the mold surface at a plurality of strategic locations in a conventional manner and they are all connected by vacuum passages in the mold to a vacuum pump. But now there is also added a vacuum passage in the mold that extends to each of the fastener accommodating cavities and these passages are also connected to the vacuum pump. The locking configuration on the anchoring side of the bases of the fasteners is coated with a heat activated adhesive and the fasteners are then inserted in these cavities and with their attaching device sheltered thereby and there locking configuration projecting outward. A sheet of thermoplastic material such as expanded vinyl is draped over the mold surface and the locking configuration on the anchoring side of the fastener bases. The plastic sheet is heated to a moldable state and the air between it and the mold surface and the anchoring sides of the fasteners is then removed through the relatively small vacuum holes in the mold surface and the large vacuum holes in the bases of the fasteners. A vacuum is thus formed to draw the heated plastic sheet onto the full area of the mold surface and also the full area of the locking configuration of the fastener bases to mold the heated plastic sheet to the contour of the mold surface to form an article and to mechanically interlock and adhere the bases of the fasteners to the formed article.

The vacuum holes in the anchoring base of the fasteners are made large enough so that the heated plastic sheet is also drawn at least partially into these holes to further increase the strength of the mechanical interlock therebetween. And where the mechanical interlock is found to provide adequate strength in a particular application, the adhesive may be omitted.

It is therefore an object of the present invention to provide a new and improved method of vacuum forming a part with an integrally joined functional device.

Another object is to provide a vacuum forming process for forming an article such as an interior trim panel substrate and mechanically joining one or more functional devices such as a fastener and alignment pin thereto wherein a heated plastic sheet is drawn onto an interlocking side of the device in interlocking relationship therewith by drawing air through one or more vacuum holes in the interlocking side of the device while the plastic sheet is being drawn onto the mold surface that defines the shape of the article by drawing air through vacuum holes in the mold surface.

Another object is to provide a method of vacuum forming an article with an integrally joined device wherein air is drawn through one or more large vacuum holes in an anchoring base of the device as well as through small vacuum holes in the mold surface in the vacuum forming process to remove air from between a heated plastic sheet and the anchoring base of the device and from between the heated plastic sheet and the mold surface to thus vacuum form an article and mechanically interlock the device at its anchoring base with the formed article.

Another object is provide a method of simultaneously vacuum forming a plastic article and joining a preformed device to the article wherein a mechanical lock configuration is formed on a base of the device, a heat activated adhesive is applied to the mechanical lock configuration, and air is drawn through small vacuum holes in the mold surface that defines the shape of the article and is also drawn directly at the mechanical lock configuration through one or more large vacuum holes in the base of the device to draw a heated sheet of thermoplastic material onto the mold surface and also into interlocking relationship with the base of the device to form the article and to mechanically interlock and adhesively bond the device to the formed article.

Another object is to provide a device that may take many different forms and has application to being molded in mechanically interlocking relationship with various vacuum formed articles.

Another object is to provide a device that may take many different forms and has application to being molded in mechanically interlocking relationship with various vacuum formed articles and also being adhesively bonded to the formed article at the interlock in the vacuum forming process.

These and other objects, advantages and features of the present invention will become more apparent from the following description and accompanying drawings wherein:

DETAILED DESCRIPTION OF THE DRAWINGS

Figure 1:
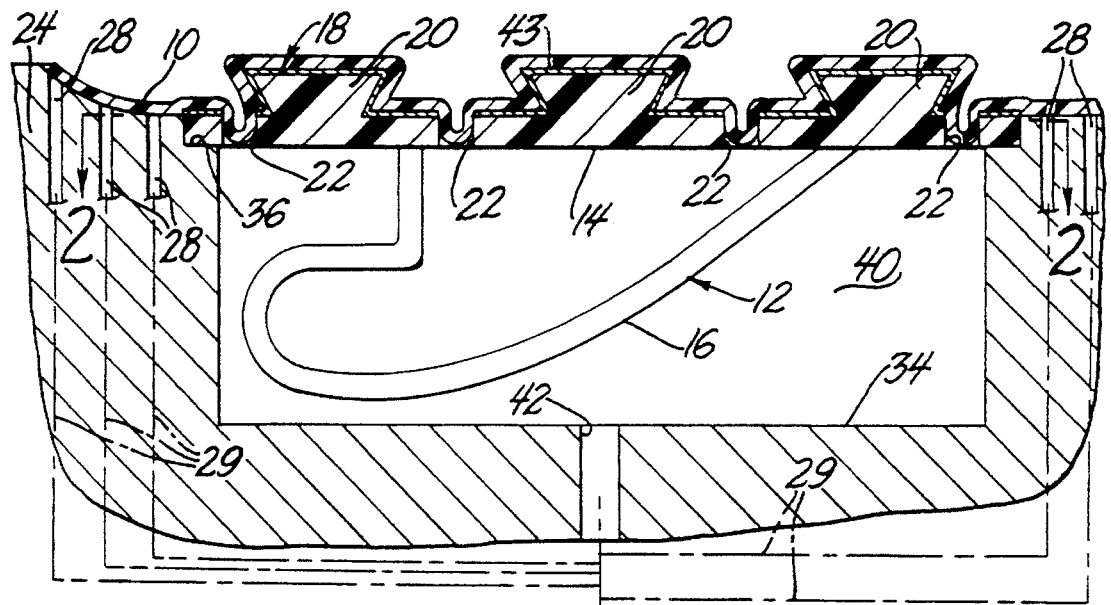
FIG. 1 is a partial cross-sectional view of an automotive trim panel substrate with an integrally joined fastener as molded in a vacuum mold in accordance with the present invention, the mold also being shown in partial cross-section in this view.

Referring to FIG. 1, there is illustrated a substrate 10 used to form the inner side of a laminated automotive interior trim panel (only a portion of the substrate being shown and none of the other layers forming the panel). It will be understood that the full shape of the substrate is formed to suit a particular trim panel shape and that the trim panel further includes a separately formed vinyl skin or cover that is laid over the substrate with a layer of urethane foam therebetween and that these panel components are held together in a suitable manner such as with an adhesive that is applied between the adjoining layers. The substrate 10 provides a stiff back for the panel and is attached to the automobile interior with a plurality of fasteners that are identical to the single fastener 12 that is illustrated. It will be understood that the fasteners are located at various locations on the substrate suitable to providing firm attachment of the trim panel in the assembly thereof in the automobile and that each of the fasteners is similarly integrally joined to the substrate as described herein with reference to the single fastener 12 that is illustrated.

Figure 3:
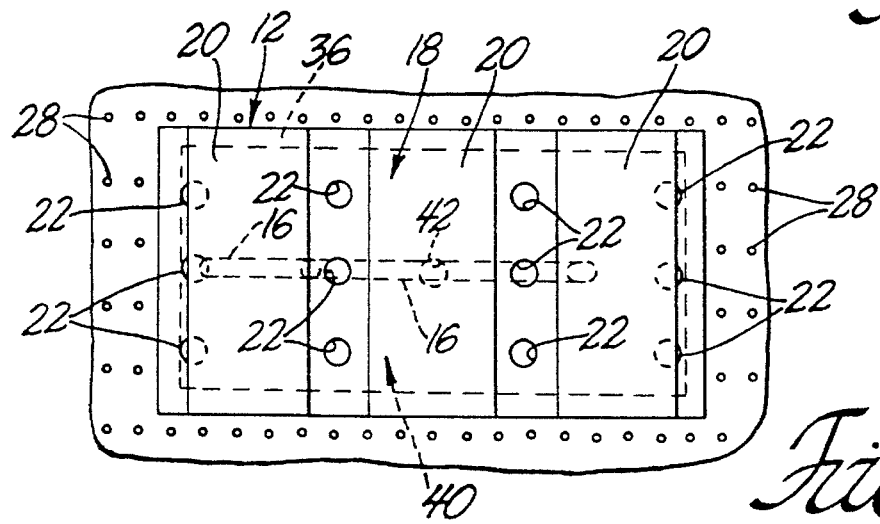
FIG. 3 is a view like FIG. 2 but showing the fastener inserted in the mold.
Figure 4:
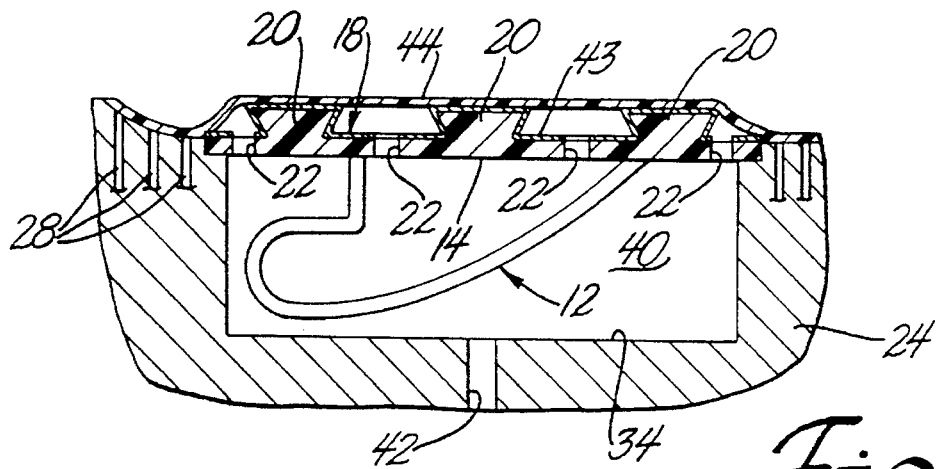
FIG. 4 is a view similar to FIG. 1 but showing a sheet of heated thermoplastic material as it is being vacuum formed to form the article and anchor the fastener.

Referring to FIGS. 1, 3 and 4, the fastener 12 is of the hook type and is preferably made of a tough plastic material such as nylon in a plastic injection mold. The fastener 12 is formed with an anchoring base 14 and an attaching hook 16 that extends from one side thereof. The base 14 is formed on the opposite side with a locking configuration 18 comprised of three projecting dovetail ridges 20 by which the fastener is adapted to mechanically interlock at its base with the substrate during the vacuum forming of the latter as described later. The base 14 is also formed with a row of three round vacuum holes 22 in the valleys between the dovetail ridges and at the base of the two outer ridges. It will also be understood and appreciated from the details of the vacuum forming process described later, that the three round vacuum holes in each row could be replaced by a slot or there could be just one vacuum hole in each valley and at each border where the ridges are very short in length. It will also be understood that there may be only one dovetail ridge depending on the interlocking strength required in a particular application. The hook 16 on the other hand is of a conventional shape commonly used to attach a substrate and thereby a trim panel in an automobile interior.

Figure 2:
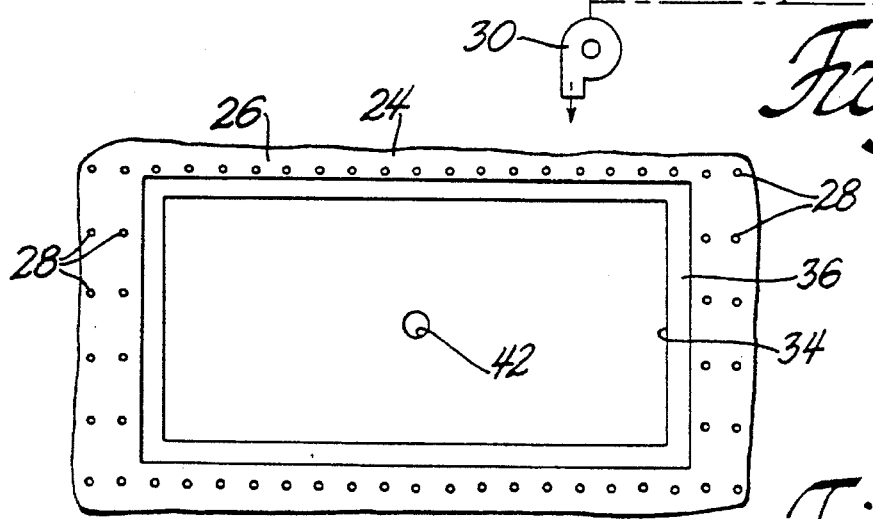
FIG. 2 is an enlarged view of the mold taken along the line 2—2 in FIG. 1 when looking in the direction of the arrows.

Referring to FIGS. 1–3, there is illustrated a mold 24 for vacuum molding the substrate 10 while integrally joining the fasteners 12 thereto (only that portion of the mold being shown that forms the portion of the substrate illustrated). The mold 24 is formed with a contoured mold surface 26 that defines the shape of the substrate and with a multitude of small vacuum holes 28 that penetrate the mold surface at spaced locations throughout the area thereof. The vacuum holes 28 are connected by a vacuum passage network 29 in the mold to a vacuum pump 30 to withdraw air at the mold surface and are strategically located so as to draw a sheet of thermoplastic material onto the mold surface in full area contact therewith when the sheet is heated to a formable state. The size of the vacuum holes is made small enough so as to not draw the heated sheet therein to any significant degree to prevent the formation of dimples in the surface of the formed substrate during the vacuum forming thereof. For example, these holes may be as small as 1.0 mm in diameter to prevent such dimpling.

The mold is further formed with a cavity 34 in its mold surface 26 for receiving each of the fasteners 12 at their desired location relative to the substrate 10. The cavity 34 is sized to receive the hook side of the fasteners and is formed with a shoulder 36 just below the mold surface 26 that supports the fastener at its base about the periphery thereof and thus at a location outboard of the vacuum holes 22 in the base. The base of the fastener is thus used to close the cavity in which it is received and defines therewith a vacuum chamber 40 that is open to the vacuum holes 22 in the fastener base. The vacuum pump 30 is connected to the bottom of each cavity 34 by a vacuum passage 42 in the vacuum passage network 29 in the mold and is thus connected to the vacuum holes 22 in the base of each of the fasteners 12 by the associated vacuum chamber 40 when the fasteners are inserted in the respective cavities.

Referring to FIG. 4, a substrate with integrally joined fasteners is formed by first inserting a set of the fasteners 12 in similar cavities 34 in the mold surface 26 (only one such insertion being shown in this view). A coating 43 of heat activated adhesive such as a polyester or epoxy resin is applied to the anchor side of the base of the fasteners either before or after their insertion in the mold. A sheet 44 of thermoplastic material such as expanded vinyl is then draped over the mold surface including the bases of the fasteners as illustrated in FIG. 4. The plastic sheet 44 is heated to a formable state or condition in a conventional manner either before or after such draping. And the vacuum pump 30 is then operated to withdraw the air from between the heated plastic sheet and the mold surface and the bases of the fasteners through the vacuum holes in the mold surface and the vacuum holes in the fastener bases. This creates a vacuum at the mold surface that draws the heated plastic sheet onto the mold surface and also a vacuum at the fastener bases in the valleys between the dovetail ridges and the borders therealong. The vacuum at the latter locations draws the heated plastic sheet tightly about the dovetail ridges in substantially full area contact therewith to form a mechanical interlocking relationship therebetween following cooling of the thermoplastic sheet to set its vacuum formed shape. The vacuum holes in the anchoring base of the fasteners are made large enough so that the heated plastic sheet is also drawn into these holes to a significant degree to further increase the strength of the mechanical interlock between the vacuum formed article and the fasteners. For example, the vacuum holes in the locking configuration of the fasteners may be several times larger in diameter than those in the mold surface so that the heated plastic sheet is drawn to the full depth of the former vacuum holes while not penetrating into the vacuum holes in the mold surface. Thus, the strength in the interlock is made even greater than obtained with the dovetail configuration and by further use of the same vacuum holes used to vacuum form the tight interlock. Moreover, the heated plastic sheet on contacting the adhesive coating activates same thereby producing an adhesive bond in the mechanical interlock that further adds to the strength of this joint. Where such added strength is not required in a particular application, this step is omitted.

Figure 5:
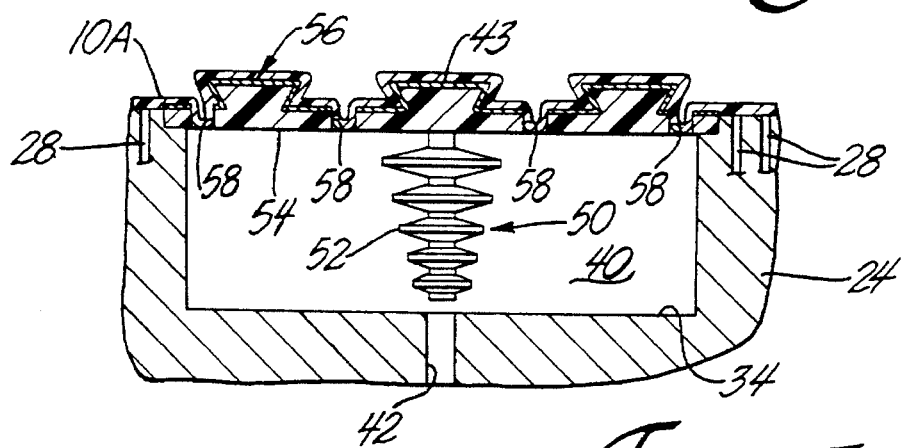
FIG. 5 is a cross-sectional view of another form of fastener and as similarly molded to a similar article.

Referring to FIG. 5, there is illustrated another form of fastener 50 that is like the fastener 12 except for having a Christmas tree type attaching device 52 that is also of a conventional type that is commonly used to attach an automotive interior trim panel in place. The fastener 50 is otherwise the same in structure as the fastener 12 with an integral base 54 having a dovetail locking configuration 56 and vacuum holes 58 and is thus similarly integrally joinable with the substrate in the vacuum molding process described above. As illustrated in FIG. 5, the mold 24 can be used to similarly vacuum form a similar substrate 10A but now with fasteners like fastener 50 locked in place instead of fasteners 12.

Figure 6:
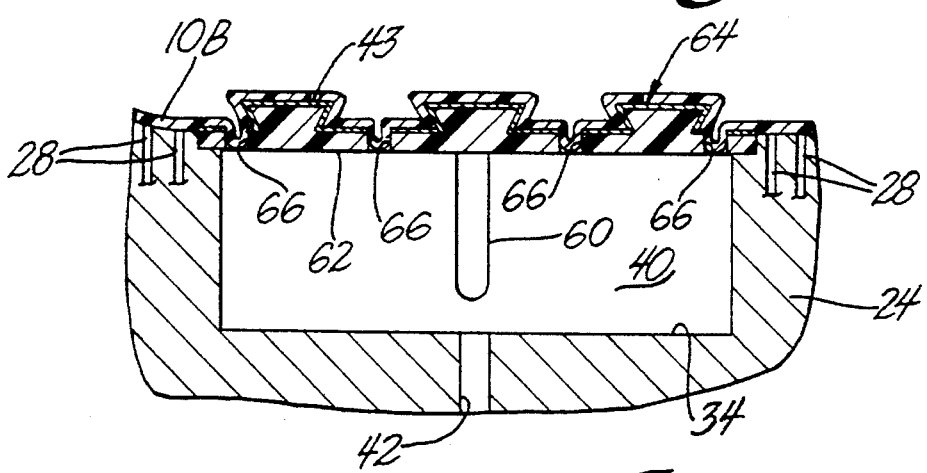
FIG. 6 is a cross-sectional view of a line-up pin having an anchoring end like the fasteners and as molded to a similar article.

In the assembly of the panel in the automobile interior, two or more alignment pins may be attached to the substrate to aid in aligning the panel for attachment to the automobile interior. Such pins may also be joined to the substrate in the same manner as the fasteners described above. Referring to FIG. 6, there is illustrated such an alignment pin 60 that is formed integral with a base 62 having a dovetail locking configuration 64 and vacuum holes 66 like the fastener 12 and is thus similarly integrally joinable with the substrate in the vacuum molding process described above. As illustrated in FIG. 6, the mold 24 can be used to similarly vacuum form a similar substrate 10B but now with one or more interlocked alignment pins like pin 60 locked in place in addition to fasteners such as fasteners 12 or 50.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, the invention has been described in reference to the formation of an automotive interior trim panel but it will be understood that the invention is also applicable to vacuum forming other forms of articles and mechanically interlocking other forms of devices therewith in the vacuum forming process. It is therefore to be understood that within the scope of the appended claims, the invention may be practiced otherwise than as specifically shown and described.

What is claimed is:

1. A method of simultaneously vacuum forming a thermoplastic article and mechanically joining a device to the article comprising the steps of:

providing the device with a locking configuration and at least one vacuum hole in the locking configuration, providing a vacuum mold with a mold surface defining the shape of the article and with vacuum holes in the mold surface and with a cavity in the mold surface for receiving said device, inserting said device in said cavity with said locking configuration projecting outward, laying a sheet of thermoplastic material heated to a formable state over said mold surface and said locking configuration, and withdrawing air from between the heated the heated thermoplastic sheet and said mold surface through said vacuum holes in said mold surface and from between the heated thermoplastic sheet and said locking configuration through said at least one vacuum hole in said locking configuration to draw the heated thermoplastic sheet onto said mold surface to form the article while also drawing the heated thermoplastic sheet onto said locking configuration in substantially full area contact therewith to form a mechanical interlock between the device and the formed article when the heated thermoplastic sheet is cooled.

2. The method set forth in claim 1 further comprising the step of applying a heat activated adhesive to said locking configuration that is activated by the heated thermoplastic sheet to adhere the thermoplastic sheet to the locking configuration where they mechanically interlock.

3. The method set forth in claim 1 further comprising the step of providing the locking configuration with at least one dovetail ridge.

4. The method set forth in claim 1 further comprising the steps of providing the locking configuration with at least two dovetail ridges, locating one of said at least one vacuum hole in said locking configuration in a valley formed between two of said at least two dovetail ridges, and providing an additional vacuum hole in said locking configuration at an outer base of at least one of said at least two dovetail ridges.

5. The method set forth in claim 1 further comprising the step of providing the at least one vacuum hole in said locking configuration so that the heated thermoplastic sheet is drawn into this at least one vacuum hole to a substantial depth.

6. The method set forth in claim 1 further comprising the step of providing the at least one vacuum hole in said locking configuration so as to be substantially larger than the vacuum holes in said mold surface.

7. The method set forth in claim 1 further comprising the step of withdrawing air through the at least one vacuum hole in the locking configuration via said cavity.

8. The method set forth in claim 1 wherein said device is a fastener with an attaching end and further comprising the steps of providing the device with a base that closes said cavity, providing the at least one vacuum hole in the locking configuration to extend through said base, providing said cavity to receive said attaching end and to support said base, and withdrawing air through the at least one vacuum hole in said base via said cavity while said attaching end is received therein.

9. The method set forth in claim 1 wherein said device is an alignment pin with an attaching end and further comprising the steps of providing the device with a base that closes said cavity, providing the at least one vacuum hole in the locking configuration to extend through said base, providing said cavity to receive said attaching end and to support said base, and withdrawing air through said at least one vacuum hole in said base via said cavity while said attaching end is received therein.

* * * * *